US007015657B2

(12) United States Patent
Wei

(10) Patent No.: US 7,015,657 B2
(45) Date of Patent: Mar. 21, 2006

(54) BALLAST FOR HIGH INTENSITY DISCHARGING LAMP

(75) Inventor: Chen-Ku Wei, Nantou (TW)

(73) Assignee: Mobiletron Electronics Co., Ltd., (TW)

( * ) Notice: Subject to any disclaimer, the term of this patent is extended or adjusted under 35 U.S.C. 154(b) by 0 days.

(21) Appl. No.: 10/837,591

(22) Filed: May 4, 2004

(65) Prior Publication Data

US 2005/0212463 A1   Sep. 29, 2005

(30) Foreign Application Priority Data

Mar. 25, 2004   (TW) .............................. 93108198 A

(51) Int. Cl.
*H05B 37/00* (2006.01)
(52) U.S. Cl. ...................... 315/291; 315/224
(58) Field of Classification Search ............ 315/209 R, 315/224, 225, 291, 307, 308, 219, 244, 128, 315/119, DIG. 7, 178
See application file for complete search history.

(56) References Cited

U.S. PATENT DOCUMENTS 3,974,430 A * 8/1976 Tyler et al. ................. 318/473
4,506,244 A * 3/1985 Jabagchourian et al. .... 335/151
5,068,570 A * 11/1991 Oda et al. ................... 315/128
6,046,549 A * 4/2000 James ......................... 315/291

OTHER PUBLICATIONS

J.R. Coaton and A.M. Marsden, Lamps and Lighting, 1997, Arnold and Contributors, 4th edition, pp. 322-324.*

* cited by examiner

*Primary Examiner*—Wilson Lee
(74) *Attorney, Agent, or Firm*—Bacon & Thomas, PLLC

(57) ABSTRACT

A ballast includes a power unit for supplying DC, a converting unit having four switches connected to the power unit for converting DC into AC, a voltage-resistant electrocontrol switch connected to the converting unit and having at least one high-voltage diode and an electrocontrol switch, all of which are arranged in parallel, a high-voltage ignition unit connected to the voltage-resistant electrocontrol switch, a current sensor connected to the converting unit, and a control circuit connected to the converting unit, the power unit, the high-voltage ignition unit, and the voltage-resistant electrocontrol switch for manipulating the actions of the aforesaid elements, such that the ballast is in high-voltage and parallel structure. In addition, the electrocontrol switch of the voltage-resistant electrocontrol switch contains inside high-voltage-resistant insulated oil for enabling the voltage-resistant electrocontrol switch to be resistant to high voltage for AC running through.

14 Claims, 7 Drawing Sheets

BALLAST FOR HIGH INTENSITY DISCHARGING LAMP

BACKGROUND OF THE INVENTION

1. Field of the Invention

The present invention relates generally to electronic circuits, and more particularly to a ballast for an HID (High Intensity Discharging) lamp.

2. Description of the Related Art

A conventional HID lamp is a gas-discharging lamp, which must be activated by high voltage. When the HID lamp is activated to stay at steady state, it is devoid of current self-control and its illuminative property is subject to variation of electric voltage or frequency to further incur qualitative alteration or short longevity. Accordingly, an electronic ballast is required to eliminate the problems indicated above.

However, a conventional ballast is merely applicable to the general gas-discharging lamp. For a more high-voltage HID lamp used in, for example, a projector or a headlamp of the car, it is necessary to use a particular ballast of specific circuits that is made by any of the world-class manufactures. Hence, such particular ballast has high production cost and high price to incur commercial unpopularity.

A conventional electronic ballast 70, as shown in FIG. 7, for use in an HID lamp is powered with DC (Direct Current) battery power from a car, including a filtering circuit 71, a flyback conversion controller 73, a full-bridge converter 75, a high-voltage ignition circuit 77, and a control circuit 79. The DC passes through the filtering circuit 71 to be filtered, enters an input end of the flyback conversion controller 73 to be provided with the required power (15–310V) for high-voltage driving and keeping the HID lamp in transient state and steady state, then outputted from the flyback conversion controller 73 and inputted into the full-bridge converter 75 and an low-voltage end of the high-voltage ignition circuit 77; the output end of the full-bridge converter 75 is electrically connected in series to the HID lamp and the high-voltage ignition circuit 77, thereby defining a high-voltage series structure; and is converted into AC (alternate current) to enter the high-voltage ignition circuit 77 to generate high voltage to ionize the high-voltage gas inside the HID lamp, such that the HID lamp is powered to illuminate. The control circuit 79 is provided for manipulating the actions of the aforesaid elements so as to control the procedure of the illumination of the HID lamp.

However, the aforementioned conventional electronic ballast 70 still includes drawbacks as follows.

1. The output range (15–310V) of the flyback conversion controller is too large, incurring production difficulty and high production cost.

2. There are four switches in the full-bridge converter. The four switches each must have voltage reactance greater than 500V, being of high production cost, of high working temperature, and less reliable.

3. The high-voltage ignition circuit is in the series structure to have less turns of the secondary coil of the transformer T3, which coil diameter is large enough to cause little reactance, such that it is difficult for induction between the primary and secondary coils to incur worse stability and coherence of the production, further resulting in unstable quality. In addition, a switch 78 must have a spark gap of high price to process the voltage of higher than 2000V, but the spark gap is subject to damage to cause damage of the whole ballast 70 mostly.

SUMMARY OF THE INVENTION

The primary objective of the present invention is to provide a ballast for an HID lamp; the ballast is preferably reliable and stable to improve the drawbacks of the prior art.

The foregoing objective of the present invention is attained by the ballast, which includes a power unit for supplying DC, a converting unit having four switches connected to the power unit for converting DC into AC, a voltage-resistant electrocontrol switch connected to the converting unit and having at least one high-voltage diode and an electrocontrol switch, all of which are arranged in parallel, a high-voltage ignition unit connected to the voltage-resistant electrocontrol switch, a current sensor connected to the converting unit, and a control circuit connected to the converting unit, the power unit, the high-voltage ignition unit, and the voltage-resistant electrocontrol switch for manipulating the actions of the aforesaid elements, such that the ballast is in high-voltage and parallel structure. In addition, the electrocontrol switch of the voltage-resistant electrocontrol switch contains inside high-voltage-resistant insulated oil for enabling the voltage-resistant electrocontrol switch to be resistant to high voltage for AC running through.

DETAILED DESCRIPTION OF PREFERRED EMBODIMENTS

Figure 1:
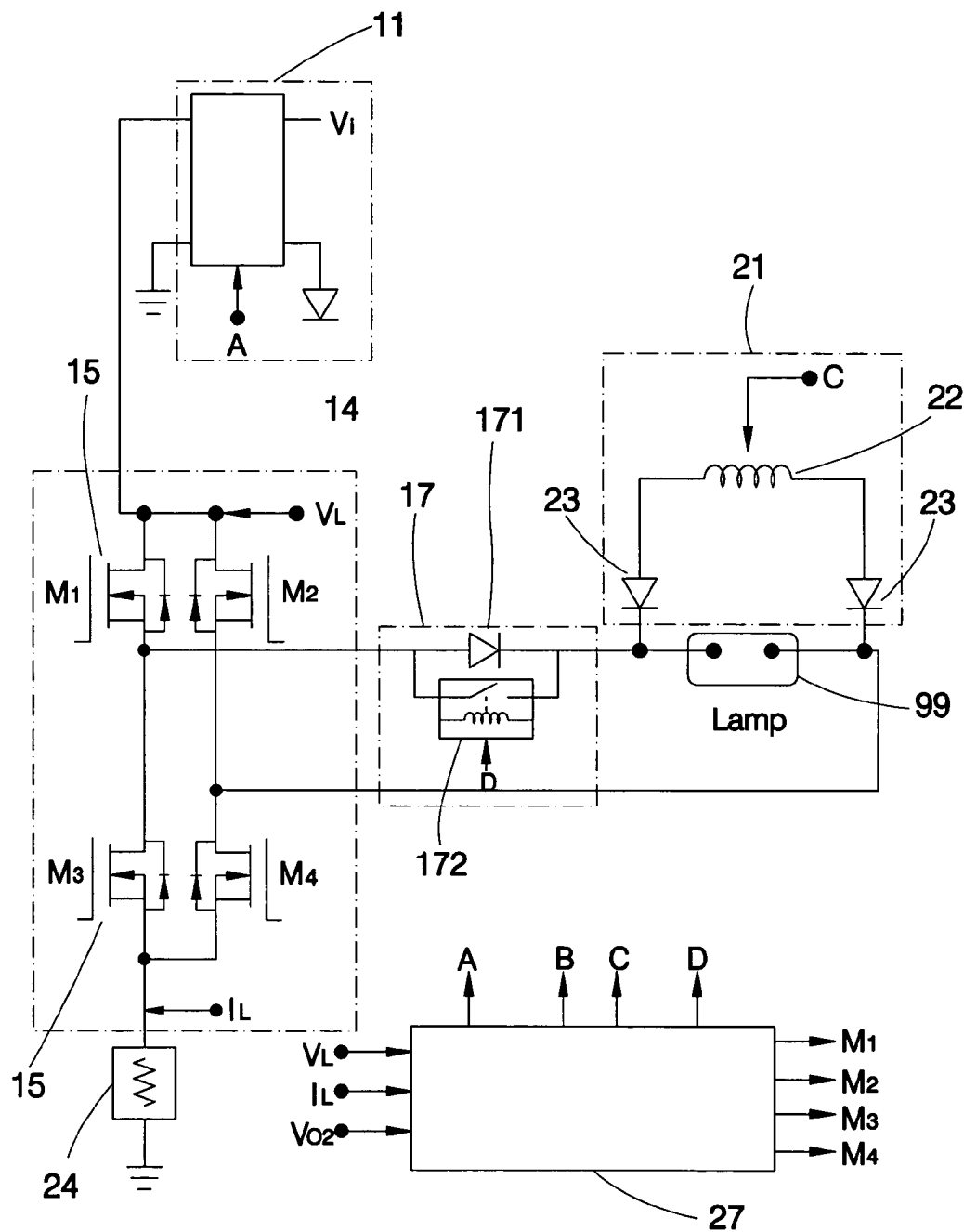
FIG. 1 is a circuit diagram of a first preferred embodiment of the present invention.

Referring to FIG. 1, a ballast 10 constructed according to a first preferred embodiment of the present invention for an HID lamp 99 is comprised of a power unit 11, a converting unit 14, a voltage-resistant electrocontrol switch 17, a high-voltage ignition unit 21, a current sensor 24, and a control circuit 27.

The power unit 11 is provided for supplying DC for the HID lamp in each of steps of glow discharge, glow transferred to arc, and arc discharge.

The converting unit 14 includes four MOSFET (Metal-Oxide-Semiconductor Field-Effect Transistor) switches 15, which are interconnected in full-bridge structure, being connected to the power unit 11 for converting DC into AC.

Figure 2:
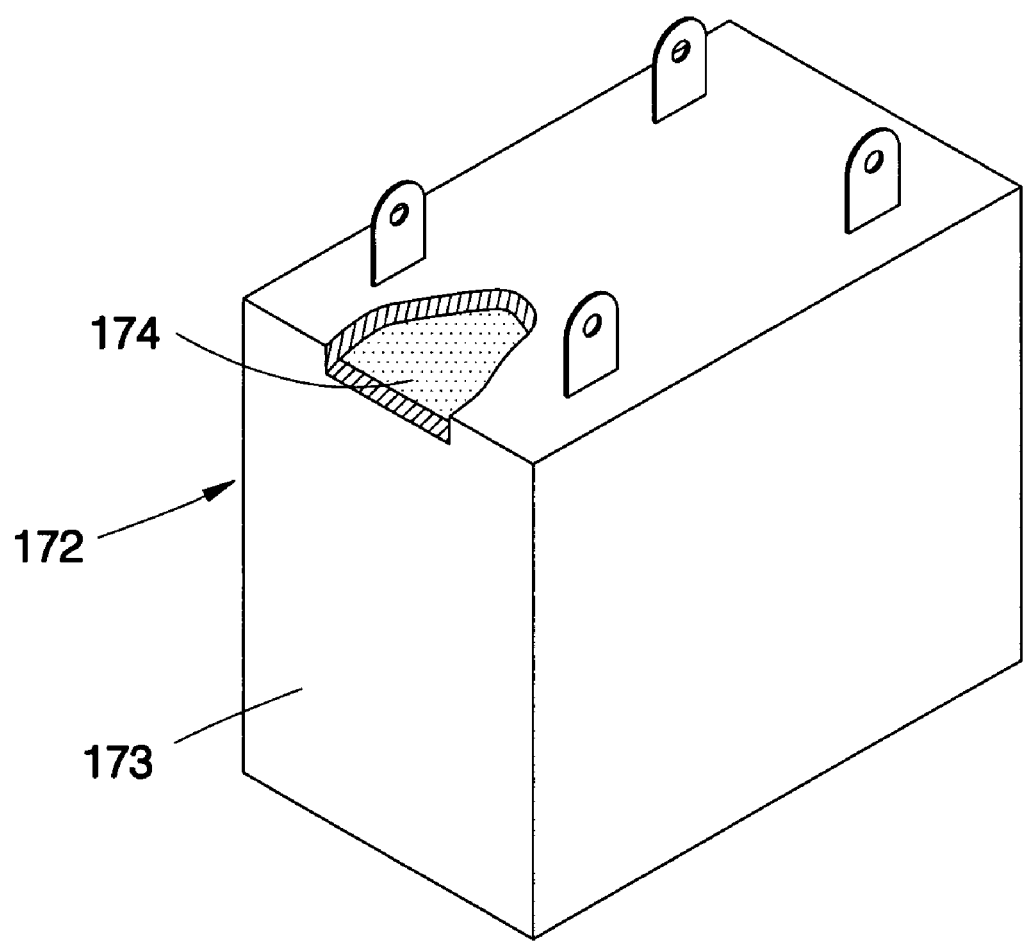
FIG. 2 is a perspective view of a voltage-resistant electrocontrol switch of the first preferred embodiment of the present invention.

The voltage-resistant electrocontrol switch 17 includes a high-voltage diode 171 and an electrocontrol switch 172, both of which are interconnected in parallel, being connected to the converting unit 14. The electrocontrol switch 172 is embodied as a high-voltage-resistant relay, as shown in FIG. 2, having a shell 173, high-voltage-resistant insulated oil 174 received in the shell 173, and other relevant components mounted in the shell 173. The high-voltageresistant insulated oil 174 enables the electrocontrol switch 172 to be resistant to high voltage while the contact is open-circuit. When the high-voltage diode 171 is connected in parallel with the electrocontrol switch 172, the high-voltage diode 171 can block the feedback of high voltage during ignition period and be passed through by AC when switch closed.

The high-voltage ignition unit 21 is formed in series of an ignition coil (a transformer secondary coil 22), and two diodes 23 and is connected to the voltage-resistant electrocontrol switch 17 for being connected with the HID lamp 99 in parallel.

The current sensor 24 is embodied as a resistor and connected to the converting unit 14.

The control circuit 27 is connected to the converting unit 14, the power unit 11, the high-voltage ignition unit 21, and the voltage-resistant electrocontrol switch 17 for manipulating the actions of the aforementioned elements.

Referring to FIG. 1 again, the power unit 11 supplies power for the HID lamp 99 in each of the steps of glow discharge, glow transferred to arc, and arc discharge. The power unit 11 also supplies high voltage for the HID lamp 99 to help breakdown of high voltage in the step of high-voltage-breakdown. The converting unit 14 supplies AC for the HID lamp 99. The high-voltage electrocontrol switch 17 can block the feedback of high voltage during ignition period and be passed through by AC when the switch is closed. The current sensor 24 can detect the electric current of the HID lamp 99. The high-voltage ignition unit 21 can electrically ionize highly compressed gas inside the HID lamp 99 when the HID lamp 99 is activated.

Further, the high-voltage ignition unit 21 is in parallel structure and the electrical current supplied for the HID lamp 99 does not pass through the secondary coil 22, such that the secondary coil 22 can be embodied as a general commercially available high-voltage igniter, like a small-engine igniter. The small-engine igniter, which has a secondary coil of over 4500 turns and is well developed and low-cost, generates long-time high voltage and great joule effect to facilitate igniting the HID lamp 99.

Figure 3:
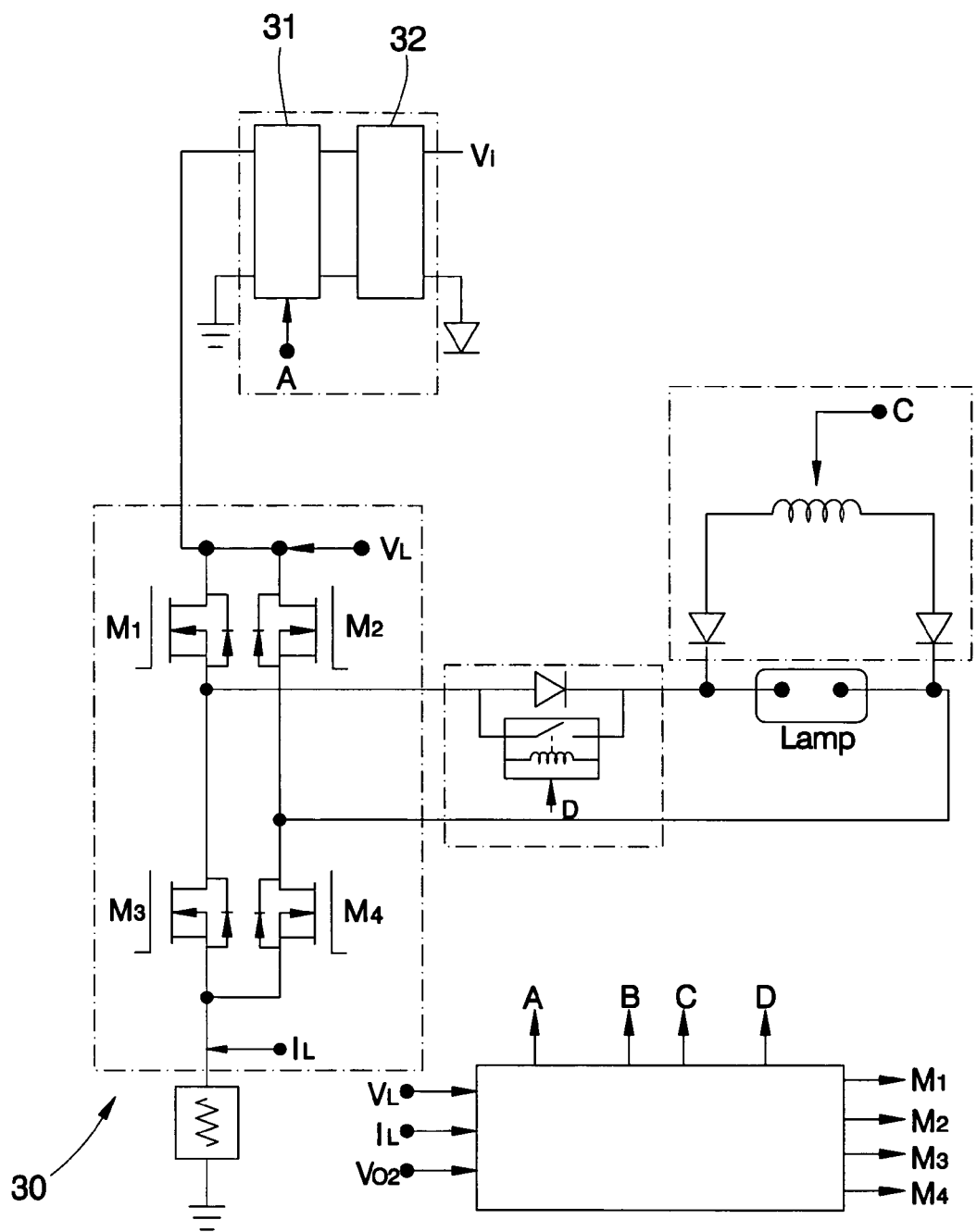
FIG. 3 is a circuit diagram of a second preferred embodiment of the present invention.

Referring to FIG. 3, the ballast 30 constructed according to a second preferred embodiment of the present invention is mostly the same as the first preferred embodiment but different merely by the following recitation. The ballast 30 further includes a filtering unit 32 connected to the power unit 31 for filtering external power source to enable the power unit 31 to supply more stable power.

Figure 4:
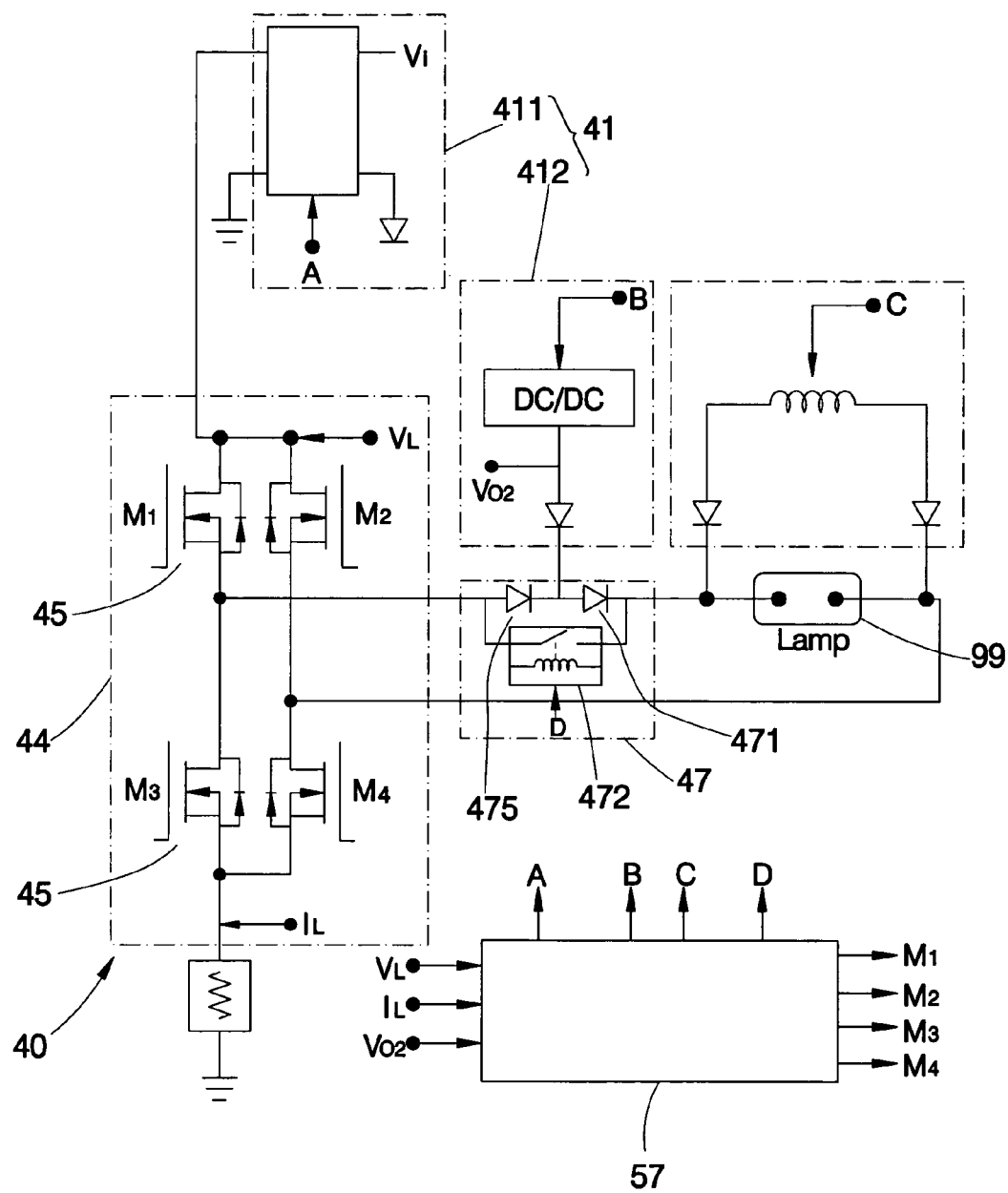
FIG. 4 a circuit diagram of a third preferred embodiment of the present invention.

Referring to FIG. 4, the ballast 40 constructed according to a third preferred embodiment of the present invention is mostly the same as the first preferred embodiment but different merely by the following recitation. The power unit 41 has a first power source 411 and a second power source 412. The first power source 411 is connected to the converting unit 44. The second power source 412 is an individual DC/DC converter connected to the control circuit 57 for supplying DC. In addition to the high-voltage diode 471 and the electrocontrol switch 472, the voltage-resistant electrocontrol switch 47 includes a diode 475 connected in series to the high-voltage diode 471. The electrocontrol switch 472 is connected in parallel to the two diodes 471 and 475, and the second power source 412 is directly connected between the two diodes 471 and 475. The second power source 412 supplies more high-voltage power (410V for open-circuit voltage) without processing by the converting unit 44, such that the output range of the first power source 411 can be preferably small, i.e. within 15–130V, and requirement for the voltage-resistant capability of each of the four switches 45 of the converting unit 44 is dramatically reduced, i.e. it is acceptable that the voltage-resistant capability of each switch 45 is over 150V. Thus, it is unnecessary to use expensive voltage-resistant elements of high voltage-resistant capability.

Figure 5:
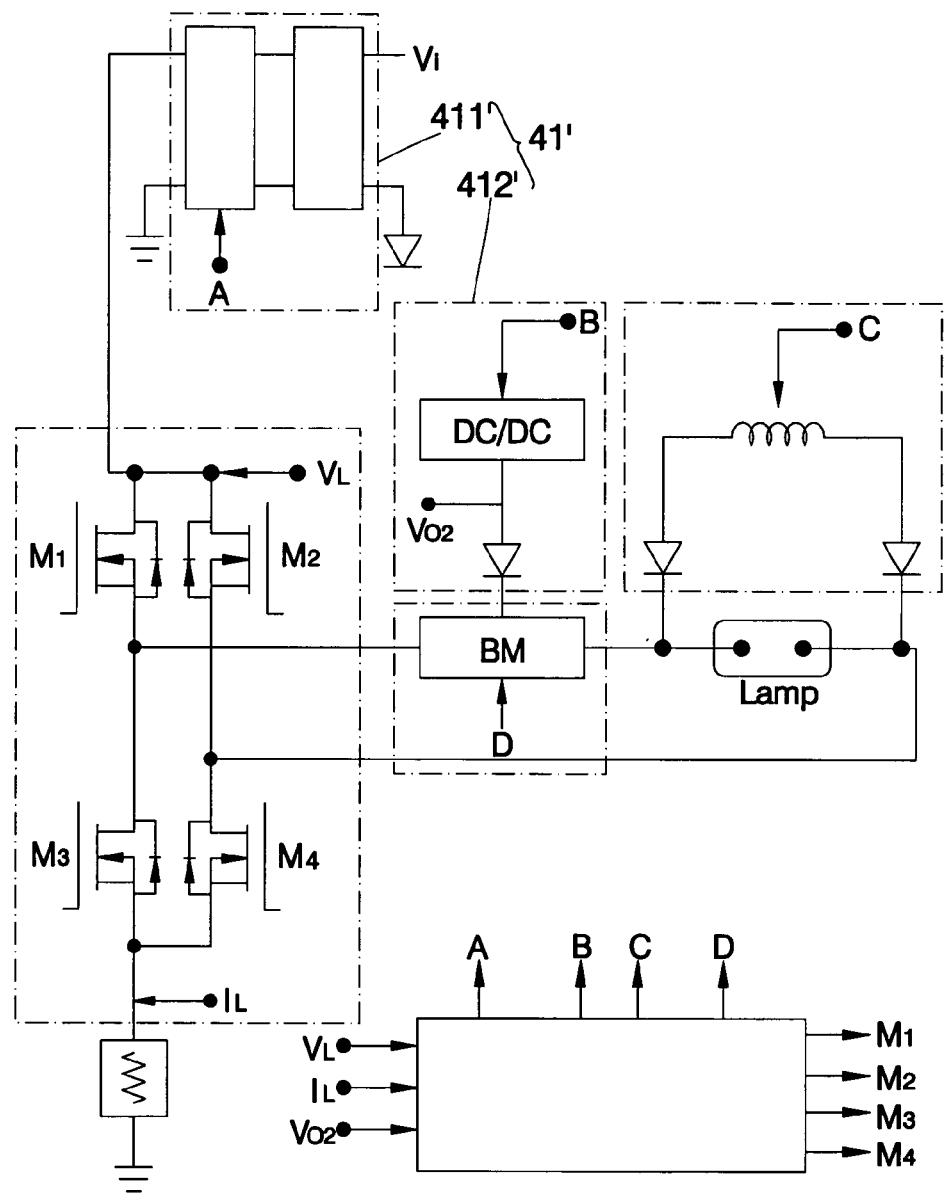
FIG. 5 is another circuit diagram of the third preferred embodiment of the present invention.

Referring to FIG. 5, the second power source 412' of the third preferred embodiment of the present invention can be alternatively acquired from double voltage of the first power source 411' of the power unit 41'.

Figure 6A:
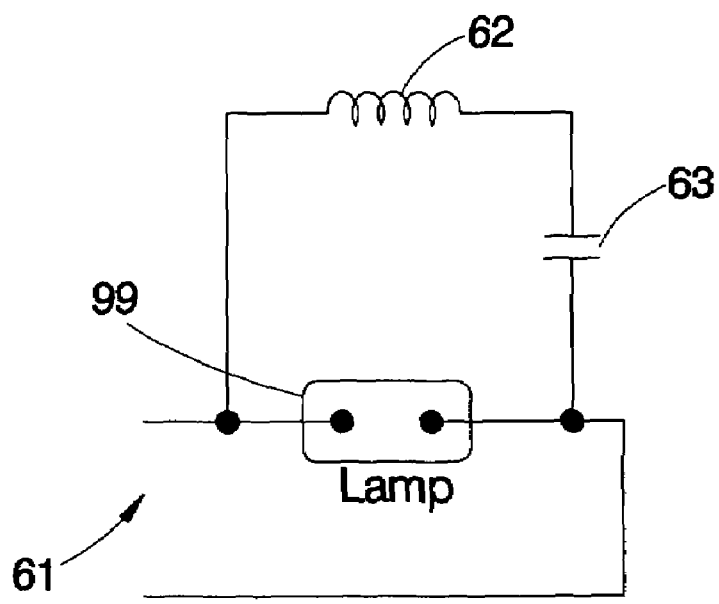
FIG. 6(A) and FIG. 6(B) are circuitries of a high-voltage ignition unit of the third preferred embodiment of the present invention.
Figure 6B:
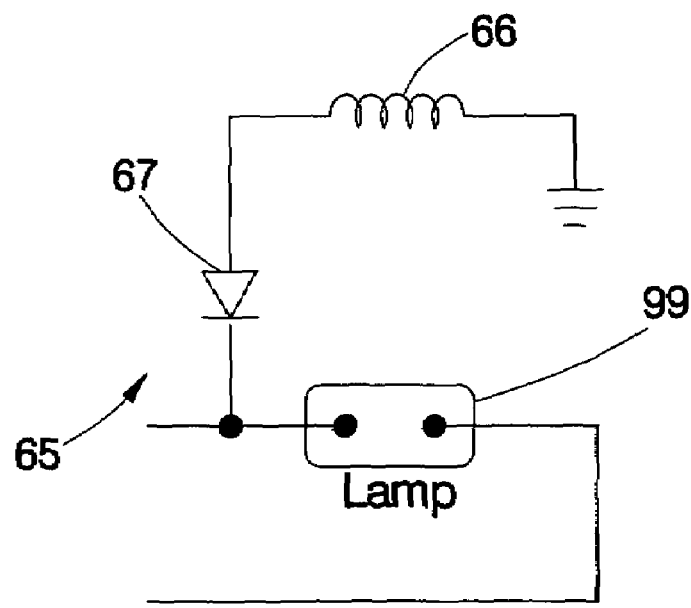
Figure 7:
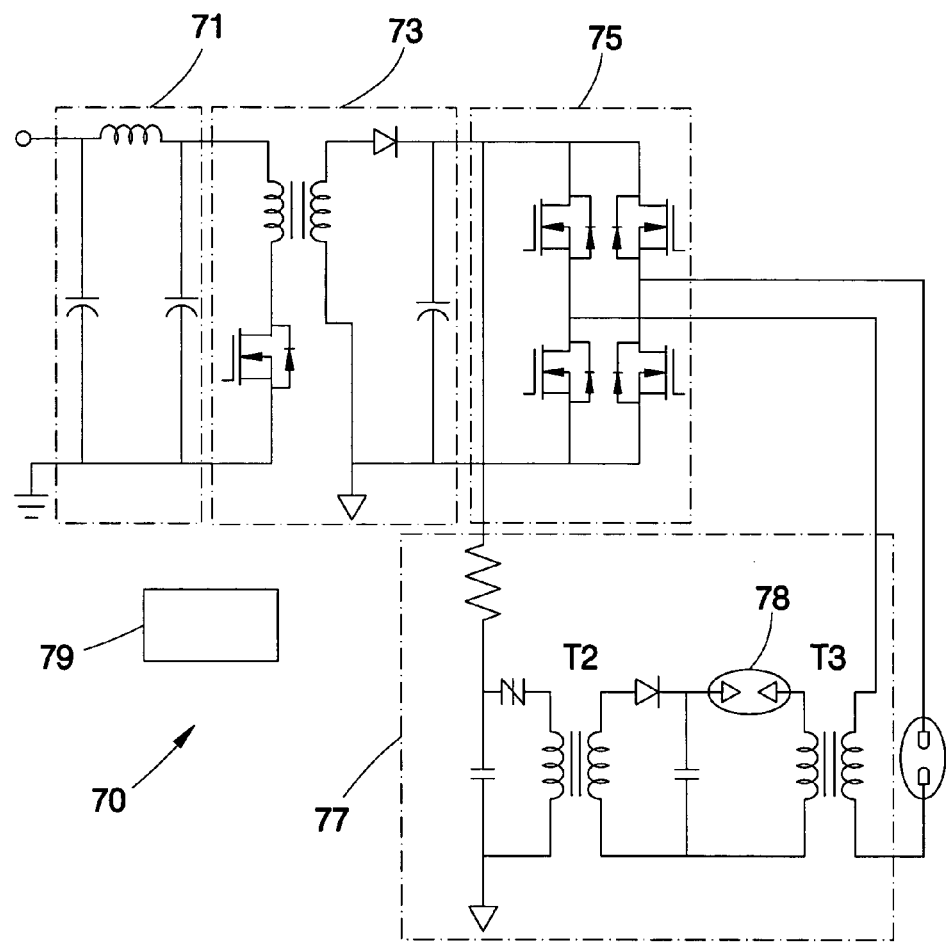
FIG. 7 is a circuit diagram of the prior art.

Referring to FIG. 6(A), the high-voltage ignition unit 61 can be alternatively formed of a transformer secondary coil 62 and a capacitor 63, both of which are interconnected in series, and connected to the HID lamp 99 in parallel to cause similar result as compared with the high-voltage ignition unit 21 of the first preferred embodiment. Referring to FIG. 6(B), the high-voltage ignition unit 65 can be alternatively formed of a transformer secondary coil 66 and a diode 67, both of which are interconnected in series, and connected to the HID lamp 99 in parallel to cause similar result as indicated above.

In aforementioned preferred embodiments, besides the resistor, the current sensor can be alternative elements of reactance, such as inductor, capacitor, etc. In other words, the current sensor of the present invention is not limited to the resistor.

From the above recitation, the present invention includes advantages as follows.

1. The output range of the power unit is within 15–130V, being smaller than the prior art to further cause production facilitation and low production cost.

2. The requirement for the voltage-resistant capability of the four switches in the full bridge converter is preferably low, i.e. it is acceptable to have the voltage-resistant capability of over 150V, and meanwhile, the working temperature of the four switches in the full bridge converter is relatively low to further enhance reliability.

3. The high-voltage ignition unit is connected in parallel to the HID lamp and the electrical current supplied for the HID lamp 99 does not pass through the secondary coil 22, such that the secondary coil 22 can be embodied as a general commercially available high-voltage igniter, like a small-engine igniter, can be applied to the present invention. The small-engine igniter, which has a secondary coil of over 4500 turns and is well developed and more low-cost than the prior art, generates high voltage of long duration and great joule effect to facilitate igniting the HID lamp 99.

What is claimed is:

1. A ballast for HID (High Intensity Discharging) lamp, said ballast comprising:
   a power unit for supplying DC (direct current);
   a converting unit having four switches and connected to said power unit for converting DC into AC (alternate current);
   a voltage-resistant electrocontrol switch connected to said converting unit and having at least one high-voltage diode and an electrocontrol switch, which are interconnected in parallel, said electrocontrol switch having a shell and high-voltage-resistant oil received in said shell, whereby said voltage-resistant electrocontrol switch is resistant to high voltage for AC passing therethrough;
   a high-voltage ignition unit connected to said voltage-resistant electrocontrol switch;
   a current sensor connected to said converting unit; and
   a control circuit connected to said converting unit, said power unit, said high-voltage ignition unit, and said voltage-resistant electrocontrol switch for controlling actions of the aforesaid elements of said ballast;

wherein said current sensor is a resistor.

2. The ballast as defined in claim 1 further comprising a filtering unit connected to said power unit.

3. The ballast as defined in claim 1, wherein said power unit comprises a first power source and second power source, said first power source being connected to said converting unit, said second power source being connected to said voltage-resistant electrocontrol switch for supplying DC.

4. The ballast as defined in claim 3, wherein said second power source is acquired from an independent transformer via step up and step down.

5. The ballast as defined in claim 3, wherein said second power source is acquired from double voltage of said first power.

6. The ballast as defined in claim 1, wherein said electrocontrol switch of said voltage-resistant electrocontrol switch is a relay.

7. The ballast as defined in claim 1, wherein said converting unit is a full-bridge converting unit having four MOSFETs (Metal-Oxide-Semiconductor Field-Effect Transistor).

8. A ballast for HID (High Intensity Discharging) lamp, said ballast comprising:

a power unit for supplying DC (direct current);

a converting unit having four switches and connected to said power unit for converting DC into AC (alternate current);

a voltage-resistant electrocontrol switch connected to said converting unit and having at least one high-voltage diode and an electrocontrol switch, which are interconnected in parallel, said electrocontrol switch having a shell and high-voltage-resistant oil received in said shell, whereby said voltage-resistant electrocontrol switch is resistant to high voltage for AC passing therethrough;

a high-voltage ignition unit connected to said voltage-resistant electrocontrol switch;

a current sensor connected to said converting unit; and a control circuit connected to said converting unit, said power unit, said high-voltage ignition unit, and said voltage-resistant electrocontrol switch for controlling actions of the aforesaid elements of said ballast;

wherein said power unit comprises a first power source and second power source, said first power source being connected to said converting unit, said second power source being connected to said voltage-resistant electrocontrol switch for supplying DC.

9. The ballast as defined in claim 8 further comprising a filtering unit connected to said power unit.

10. The ballast as defined in claim 8, wherein said second power source is acquired form an independent transformer via step up and step down.

11. The ballast as defined in claim 8, wherein said second power source is acquired from double voltage of said first power.

12. The ballast as defined in claim 8, wherein said current sensor is a resistor.

13. The ballast as defined in claim 8, wherein said electrocontrol switch of said voltage-resistant electrocontrol switch is a relay.

14. The ballast as defined in claim 8, wherein said converting unit is a full-bridge converting unit having four MOSFETs (Metal-Oxide-Semiconductor Field-Effect Transistor).

* * * * *